(12) United States Patent
Settineri

(10) Patent No.: US 7,055,668 B2
(45) Date of Patent: Jun. 6, 2006

(54) ANTI-AIR LOCK SYSTEM FOR A PNEUMATIC FAN DRIVE CLUTCH ASSEMBLY

(75) Inventor: Samuel E Settineri, Marshall, MI (US)

(73) Assignee: BorgWarner Inc., Auburn Hills, MI (US)

( * ) Notice: Subject to any disclaimer, the term of this patent is extended or adjusted under 35 U.S.C. 154(b) by 79 days.

(21) Appl. No.: 10/711,895

(22) Filed: Oct. 12, 2004

(65) Prior Publication Data

US 2006/0076210 A1 Apr. 13, 2006

(51) Int. Cl.
*F16D 25/0632* (2006.01)
*F16D 25/12* (2006.01)

(52) U.S. Cl. .................... 192/91 A; 192/89.27
(58) Field of Classification Search ........... 192/85 CA, 192/91 A, 89.27
See application file for complete search history.

(56) References Cited

U.S. PATENT DOCUMENTS

| | | | | |
|---|---|---|---|---|
| 2,637,308 A | * | 5/1953 | Dodge ................... 123/41.08 |
| 2,723,735 A | | 11/1955 | Banker | |
| 3,777,866 A | * | 12/1973 | Elmer ..................... 192/91 A |
| 3,848,622 A | | 11/1974 | Cummings, III | |
| 3,985,214 A | * | 10/1976 | Hall et al. .............. 192/91 A |
| 4,362,226 A | | 12/1982 | Gee | |
| 4,830,161 A | * | 5/1989 | Hall et al. .............. 192/91 A |
| 4,998,607 A | | 3/1991 | Mizutani et al. | |
| 5,611,415 A | | 3/1997 | Davis et al. | |

* cited by examiner

*Primary Examiner*—Richard M. Lorence
(74) *Attorney, Agent, or Firm*—Artz & Artz, P.C.; Greg Dziegielewski

(57) ABSTRACT

A clutch assembly (20) for a fan drive system (12) of an engine (14) includes a translatable clutch housing (30) that is coupled to a fan (16). A rotating shaft (32) is coupled to a drive pulley (22) of the engine (14). A liner (34) resides between and is engageable with the translatable clutch housing (30) and the rotating shaft (32). A clutch spring (35) engages the translatable clutch housing (30) with the rotating shaft (32). A spring carrier (42) retains a portion of the clutch spring (35) and comprises a passage (46) for fluid pressure adjustment within a clutch spring area (38) of the clutch assembly (20).

30 Claims, 4 Drawing Sheets

ANTI-AIR LOCK SYSTEM FOR A PNEUMATIC FAN DRIVE CLUTCH ASSEMBLY

TECHNICAL FIELD

The invention relates generally to fan drive systems and more specifically to preventing the blockage of an air exhaust path within a pneumatically controlled fan drive system.

BACKGROUND ART

The present invention relates to fluid coupling devices and to friction coupling devices that drive radiator cooling fans. Such coupling devices are generally of two types, viscous clutch drives and dry friction clutch drives, respectively. Viscous drives have varying degrees of engagement and are used for their ability to cycle repeat and engage at higher engine speeds. Dry friction drives are used for their ability to turn at fully engaged peak operating speeds or at higher speeds than originally designed, as well as for their relatively cool operating temperature. Dry friction drives are also generally less complex.

Dry friction drives tend to have two operating conditions "ON and OFF" referring to when a friction clutch is either fully engaged or fully disengaged. When a friction clutch assembly is fully engaged the clutch assembly provides cooling to an associated engine and is not slipping. When a friction clutch assembly is fully disengaged, slip speed between a clutch plate and an engagement surface is at a maximum and cooling is no longer provided.

During the actuation of a dry friction clutch between full engagement and full disengagement, the internal air volume within the clutch assembly changes. This change in volume creates a change in internal pressure. As a result of this change in internal pressure, air passes between a small clearance gap between a spring carrier and a pneumatic transfer conduit or piston rod. Over time this clearance gap or exhaust gap can become blocked, due to internal contaminates and grease or fretting corrosion between the spring carrier and the piston rod, which can build up and block the flow of air.

The phenomena of blocking the exhaust gap can cause contaminants to be forced through bearings in the fan clutch. The blocking of the airflow between the spring carrier and the piston rod forces the air to travel an alternate route, such as through the grease seal of a proximate bearing. This alternative route is undesirable, due to potential contamination of the bearing internals. Forcing of the air through clutch bearings degrades and reduces the service life of the bearings and thus reduces the service life of the clutch assembly.

The application of grease to the interface between the spring carrier and the piston rod can temporarily prevent the fretting corrosion. However, due to the small size of the clearance gap deposits can still build up and block the airflow. In addition, the applied grease can block the airflow and increase the flow of air through the clutch bearings. Also, the opening or the increasing of the separation distance of the interface between the spring carrier and the piston rod is not feasible, as the tight radial fit therebetween is desired for proper clutch operation.

There is a desire to increase fan clutch service life such that a fan clutch is capable of being operated over increasingly higher mileages. Thus, there is a need for an improved friction clutch assembly that accounts for the changes in internal air pressure and provides the desired clearances between clutch components for proper operation thereof. It is also desirable that the improved friction clutch assembly be similar in complexity and cost to that of traditional friction fan drive systems.

SUMMARY OF THE INVENTION

The present invention addresses the issues described above and provides a friction clutch assembly for a fan drive system of an engine that includes a translatable clutch housing. The translatable clutch housing is coupled to a fan. A rotating shaft is coupled to a drive pulley of the engine. A friction liner resides between, and is engageable with, the translatable clutch housing and the rotating shaft. A clutch spring engages the translatable clutch housing with the rotating shaft. A spring carrier retains a portion of the clutch spring and comprises a passage for fluid pressure adjustment within a clutch spring area of the friction clutch assembly.

The embodiments of the present invention provide several advantages. A couple of such advantages are the provisions of a spring carrier and/or a piston rod for a clutch assembly that includes one or more passages for fluid pressure adjustment within a clutch spring area. The inclusion of the passages allows for internal fluid pressures to adjust during actuation of a clutch housing without fluid passage through seals or bearings.

Another advantage provided by an embodiment of the present invention is the provision of an internal fluid adjustment passage without the eventual blockage thereof over time, due to corrosion and/or build up of deposits. The utilization of the internal fluid adjustment passage improves robustness of a fan clutch and allows for increased service life of the fan clutch through increased bearing life.

Yet another advantage provided by an embodiment of the present invention is the provision of a spring carrier that satisfies desired clearances with a piston rod or pneumatic transfer conduit for proper operation thereof.

Furthermore, the present invention provides an improved clutch assembly that is simple in design and cost effective.

The present invention itself, together with attendant advantages, will be best understood by reference to the following detailed description, taken in conjunction with the accompanying figures.

DETAILED DESCRIPTION

Figure 1:
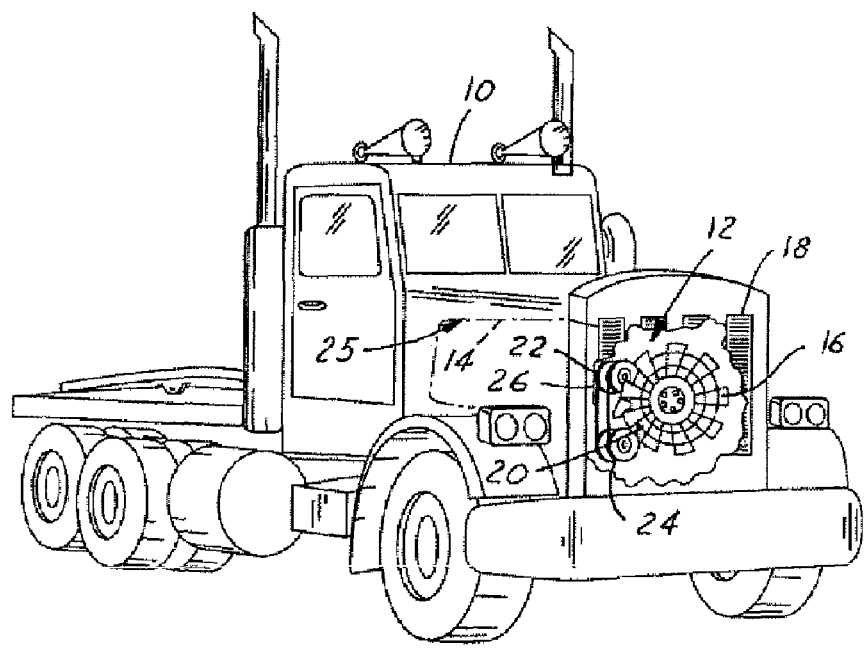
FIG. 1 is a perspective view of a vehicle utilizing a fluidically controlled fan drive system in accordance with an embodiment of the present invention.

In the following figures the same reference numerals will be used to refer to the same components. While the present invention is described primarily with respect to a system for preventing the blockage of air through an exhaust path within a pneumatically controlled fan drive system, the present invention may be adapted and applied to various systems including: hydraulic systems, pneudraulic systems, mechanical systems, pneumatic systems, vehicle systems, cooling systems, fan drive systems, friction drive systems, or other systems.

In the following description, various operating parameters and components are described for one constructed embodiment. These specific parameters and components are included as examples and are not meant to be limiting.

Also, in the following description various fan drive components and assemblies are described as an illustrative example. The fan drive components and assemblies may be modified depending upon the application.

Although the present invention may be used advantageously in various configurations and applications, it is especially advantageous in a coupling device of the type used to drive a radiator cooling fan of an internal combustion engine for an over the road truck. An example of an over the road truck is a class 8 truck for which the present invention will be primarily described in connection therewith.

Referring now to FIG. 1, a perspective view of a vehicle 10 utilizing a fluidically controlled fan drive system 12 in accordance with an embodiment of the present invention is shown. The system 12 uses rotational energy from a liquid cooled engine 14 at an increased ratio to turn a radiator cooling fan 16 to provide airflow through a radiator 18. The system 12 includes a friction clutch assembly 20 that is fixed to one or more pulleys, such as pulley 22, which is coupled to and rotates relative to a crankshaft (not shown) of the engine 14. The pulleys rotate via a pair of belts 24, within an engine compartment 25. Of course, the present invention may be relatively operative in relation to various components and via any number of belts or other coupling devices, such as a timing chain. The friction clutch assembly 20 is mounted on the engine 14 via a mounting bracket 26. The friction clutch assembly 20 pneumatically engages the fan 16 during desired cooling intervals to reduce the temperature of the engine 14.

The fan 16 may be attached to the friction clutch assembly 20 by any suitable means, such as is generally well known in the art. It should be understood, however, that the use of the present invention is not limited to any particular configuration of the system 12, or fan mounting arrangement, or any particular application for the system 12, except as is specifically noted hereinafter.

Figure 2:
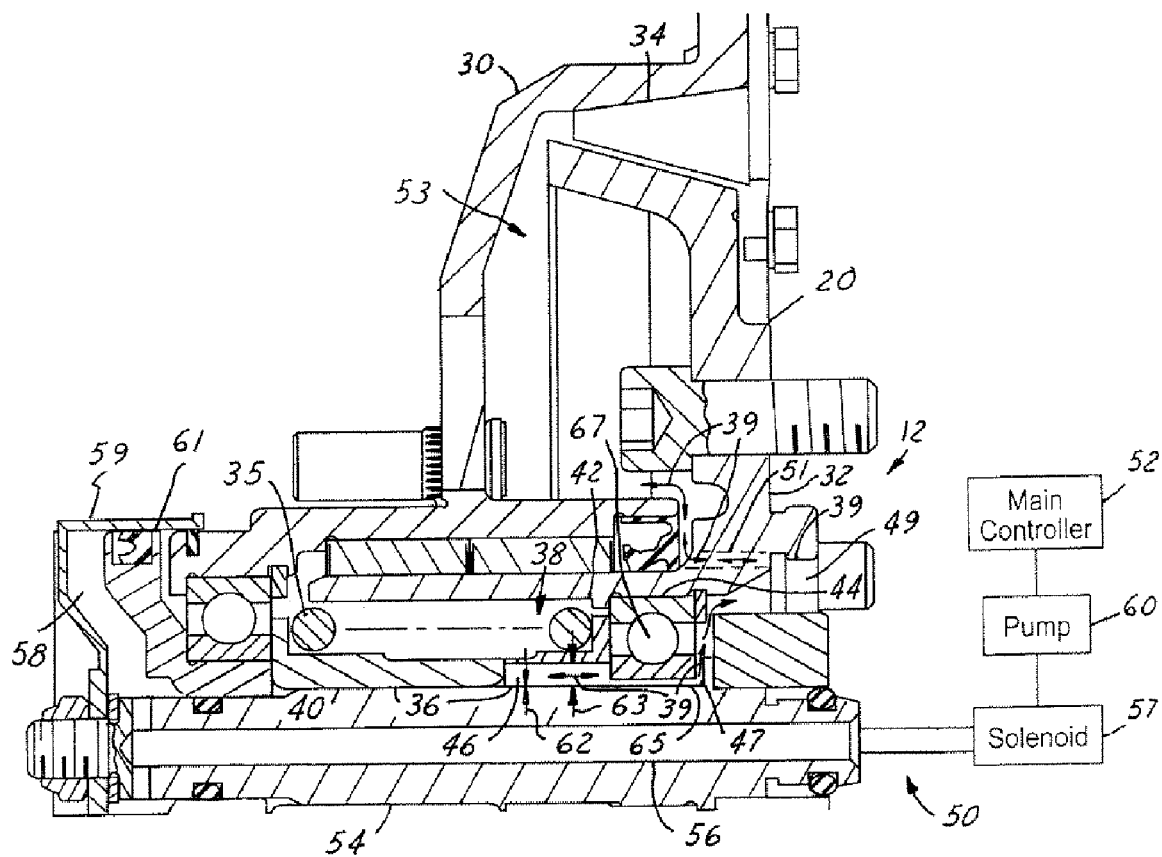
FIG. 2 is a quarter side cross-sectional view of a friction clutch assembly incorporating an anti-lock spring carrier in accordance with an embodiment of the present invention.

Referring now to FIG. 2, a quarter side cross-sectional view of the friction clutch assembly 20 in accordance with an embodiment of the present invention is shown. The assembly 20 includes a translatable clutch housing 30 and a rotating shaft 32. The clutch housing 30 is attached to an engine cooling fan, such as fan 16. The rotating shaft 32 is coupled to a drive pulley, such as pulley 22. A friction liner 34 is coupled to the clutch housing 30 and resides between the clutch housing 30 and the rotating shaft 32. A clutch spring 35 engages the clutch housing 30 with the rotating shaft 32. The clutch spring 35 resides on a pair of spring carriers or retainers 36, within a clutch spring area 38, and within the shaft 32. The clutch spring area 38 generally refers to the internal volume between the shaft 32 and the spring retainers 36. The spring retainers 36 include a first spring retainer 40 and a second spring retainer 42. The second spring retainer 42 is in the form of an anti-air lock spring carrier and resides between the first spring retainer 40 and a shaft bearing 44.

The anti-air lock carrier 42 includes one or more passages 46 (only one is shown) for fluid pressure adjustment within the clutch spring area 38. In operation, air, as represented by arrows 39, is forced in and out of the spring area 38, through the passages 46 through a piston rod bearing groove 47, through a rear cavity 49, through a shaft channel 51, and into the housing cavity 53.

The friction clutch assembly 20 also includes a fluidic control circuit 50 that is operated via a main controller 52. The fluidic control circuit 50 includes a piston rod or pneumatic transfer conduit 54 with a fluid channel 56 residing therein for the transfer of fluid, such as air, into a piston reservoir 58 of an air cylinder 59. The air cylinder 59 resides over a piston 61. A fluid pump 60 and corresponding solenoid 57 are fluidically coupled to the fluid channel 56. The main controller 52 is coupled to the pump 60 and to the solenoid 57 and adjusts the flow of the fluid into and out of the reservoir 58. The solenoid may be replaced with other types of valves known in the art.

A small clearance gap 62 exists between the anti-air lock carrier 42 and the conduit 54 for proper clutch operation. The clearance gap 62 allows for tight radial clearances between the spring 35 and the shaft 32, between the spring 35 and the spring retainers 40 and 42, and precise operation of the spring 35 in the spring area 38. The clearance gap 62 also allows for alignment of the spring 35 with the rear bearing 65, in other words, in alignment with the center axis 67 of the rear bearing 65. The clearance gap 62 may be greased and/or lubricated to prevent corrosion of the anti-air lock carrier 42 and the conduit 54, due to the use of the passages 46. The passages 46 aid in the prevention of blockage of the clearance gap 62 due to deposits from the flow of air therethrough. The passage 46 has a depth 63 that is larger than the clearance gap 62. A majority of the air entering or exiting the clutch spring area 38 may pass uninhibited through the passages rather than being forced in and out of the clutch cavity through the sealed ball bearings 44.

The main controller 52 may be contained within the system 12 or may be separate from the system 12 as shown. The main controller 52 may be microprocessor based such as a computer having a central processing unit, memory (RAM and/or ROM), and associated input and output buses. The main controller 52 may be a portion of a central vehicle main control unit, an interactive vehicle dynamics module, a cooling system controller, or may be a stand-alone controller as shown.

In operation, the friction clutch assembly 20 is frequently engaged. When engaged, no fluid is pumped into the reservoir 58. The piston 61 and thus the housing 30 are in a fully engaged position. In the engaged position the spring 35 is decompressed or in an expanded state. When cooling is no longer desired the main controller 52 pumps fluid into the reservoir 58, which causes the piston 61 to shift rearward, towards the shaft 32. As the piston 61 shifts rearward, the housing 30 also shifts rearward, thereby, compressing the spring 35 and causing the friction liner 34 and thus the housing 30 to disengage with the shaft 32. As the spring 35 compresses, the volume of the spring retainer area 38 decreases, which forces air within the spring retainer area 38 to pass through the passages 46.

Figure 3A:
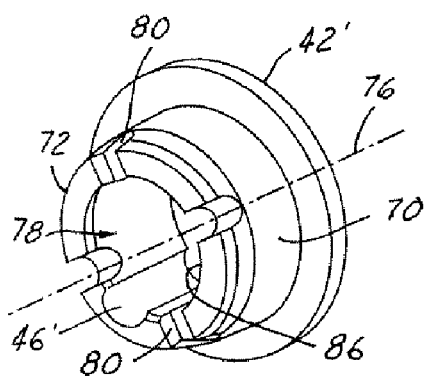
FIG. 3A is a perspective view of a spring carrier in accordance with an embodiment of the present invention.
Figure 3B:
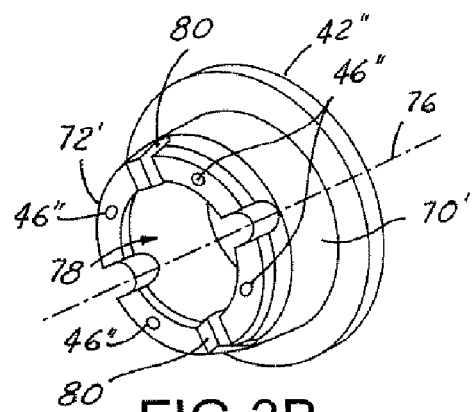
FIG. 3B is a perspective view of a spring carrier in accordance with an embodiment of the present invention.

Referring now to FIGS. 3A–B, perspective views of spring carriers 42' and 42" in accordance with embodiments of the present invention are shown. The spring carriers 42' and 42" include main wall sections 70 and 70' having attachment rings 72 and 72', respectively. The main wall sections 70 and 70' are coupled to spring retainer lips 74 that protrude orthogonal to and away from the center axes 76 of the spring carriers 70 and 70'. The main wall sections 70 and 70' and the spring retainer lips 74 are formed, for simplicity, as single integral units. The center axes 76 extends longitudinally in fore and aft directions through the centers 78 of the spring carriers 42' and 42". The attachment rings 72 and 72' are recessed.

The main wall sections 70 and 70' include the passage 46' and the passages 46", respectively. In the embodiment of FIG. 3A, the passage 46' is in the form of a groove that is integrally formed within and resides on the internal side 86 of the main wall section 70. In the embodiment of FIG. 3B, the passages 46" are in the form of holes or channels within the main wall section 70'. The passages 46' and 46" extend axially across and through the main wall sections 70 and 70'. Although a specific number of passages are shown, any number may be utilized. The passages 46' and 46" may be of various sizes and shapes and may be in the form of grooves, channels, holes, slots, or may be in some other form known in the art.

Figure 4:
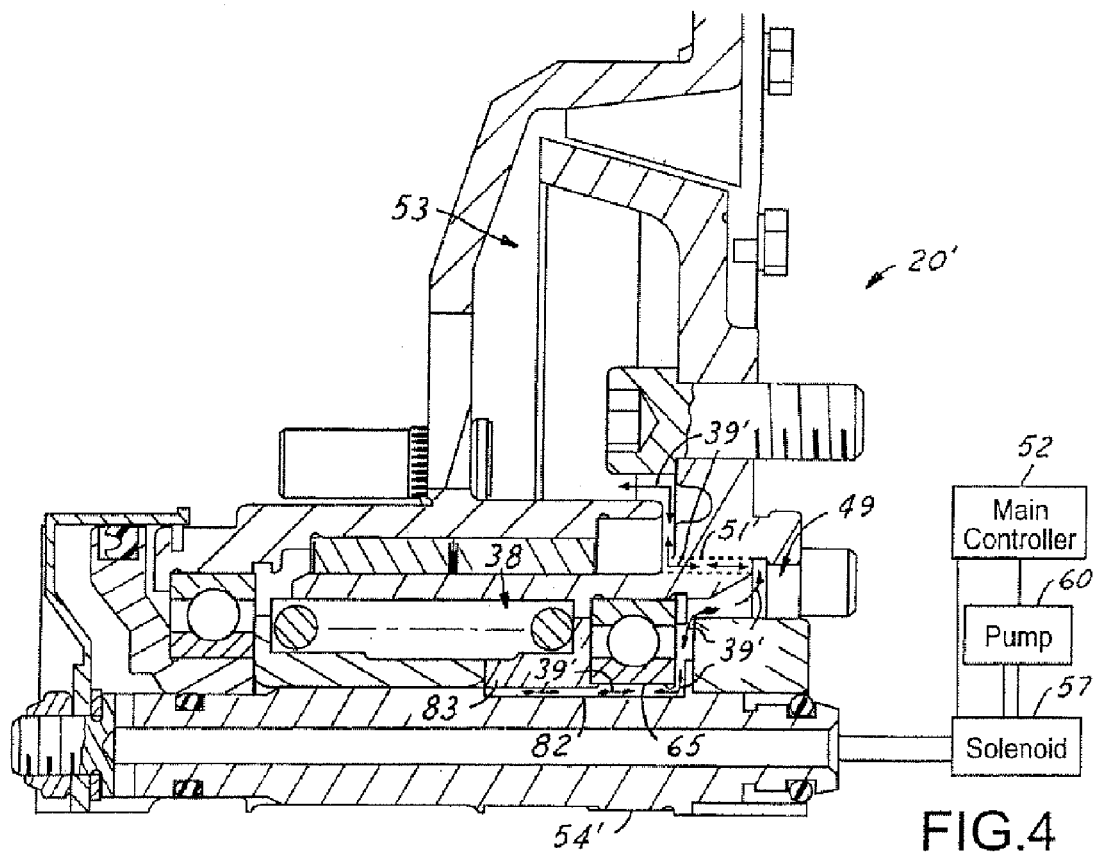
FIG. 4 is a quarter side cross-sectional view of a friction clutch assembly incorporating a piston rod with an anti-lock groove in accordance with another embodiment of the present invention.
Figure 5:
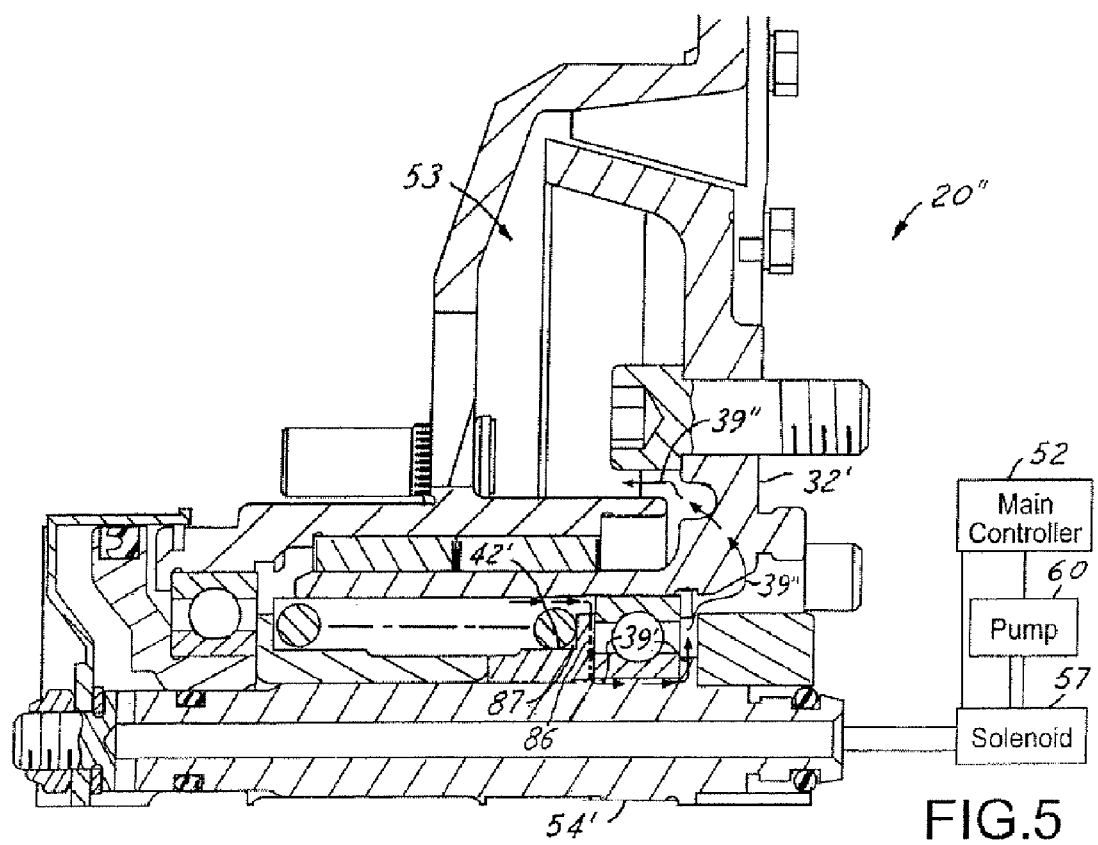
FIG. 5 is a quarter side cross-sectional view of a friction clutch assembly incorporating an anti-lock spring carrier in accordance with still another embodiment of the present invention.

FIGS. 4 and 5 described below are alternative example embodiments of the present invention.

Referring now to FIG. 4, a quarter side cross-sectional view of a friction clutch assembly 20' incorporating a piston rod 54' with a passage in the form of an anti-lock groove 82 in accordance with another embodiment of the present invention is shown. The anti-lock groove 82 extends longitudinally along the piston rod 54' across the non-grooved spring carrier 83 and across the rear bearing 65. As with the passages 46 and the bearing groove 47, air passes through the anti-lock groove 82 to compensate for air fluctuations in the bearing area 38. In operation, air, as represented by arrows 39', passes through the anti-lock groove 82, through a rear cavity 49, through a shaft channel 51, and into the housing cavity 53.

Figure 6:
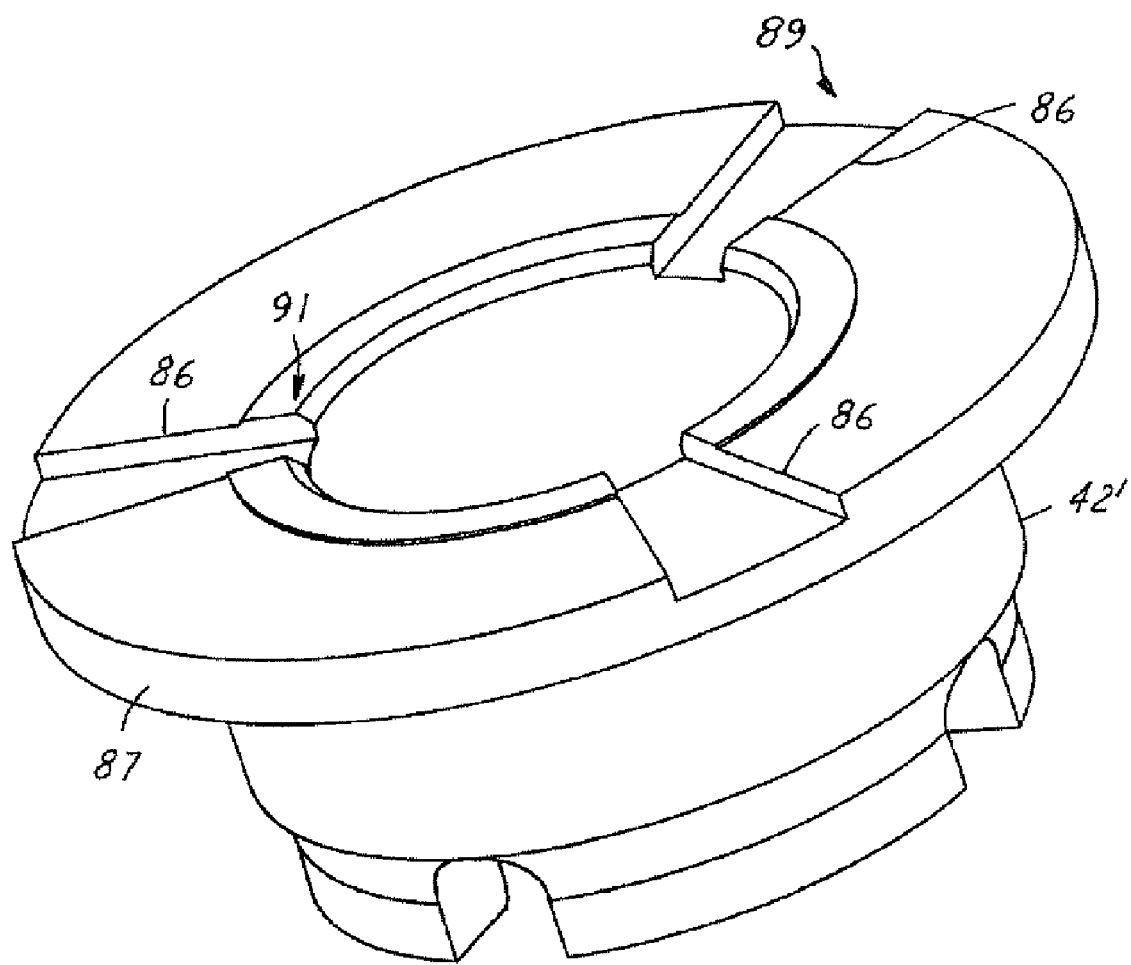
FIG. 6 is a perspective view of an anti-lock spring carrier incorporating inwardly directed fluid passages in accordance with another embodiment of the present invention.

Referring now to FIG. 5, a quarter side cross-sectional view of a friction clutch assembly 20" incorporating an anti-lock spring carrier 42' in accordance with still another embodiment of the present invention is shown. The anti-lock spring carrier 42' is similar to the spring carrier 42 except that instead of having a passage in the form of an inner groove, such as passage 46, the spring carrier 42' has an inwardly directed passage or grooves 86. The inwardly directed grooves 86 resides on a spring retention flange or base 87 of the spring carrier 42'. The inwardly directed grooves 86 can be best seen in FIG. 6 and direct fluid at a direction perpendicular to and towards the piston rod 54. The inwardly directed grooves 86 are tapered inward such that they are wider near an outer periphery 89 and narrower near an inner periphery 91 of the anti-lock spring carrier 42'. In operation, air, as represented by arrows 39", passes through the inwardly directed grooves 86, around the bearing 65, and into the housing cavity 53. The air 39" may be routed to the rear cavity 49, through the shaft 32' and into the housing cavity 53, as in the embodiments of FIGS. 2 and 4.

Figure 7:
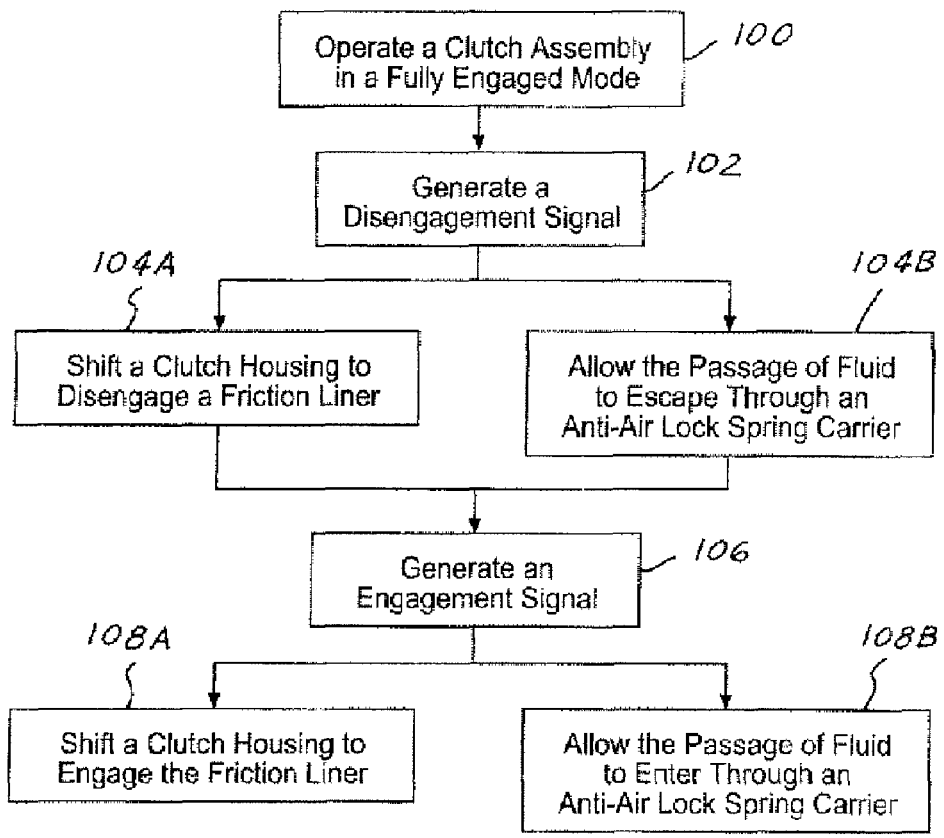
FIG. 7 is a logic flow diagram illustrating a method of operating a clutch assembly in accordance with an embodiment of the present invention.

Referring now to FIG. 7, a logic flow diagram illustrating a method of operating the clutch assembly 20 in accordance with an embodiment of the present invention is shown. The following steps describe one example cycle of the clutch assembly 20 between the fully engaged state and the fully disengaged state. Although the method of FIG. 7 is described primarily with respect to the clutch assembly 20, it may be modified and easily applied to the clutch assemblies 20' and 20".

In step 100, the clutch assembly 20 is operated in the default or fully engaged mode. While in the fully engaged mode, the controller 52 opens the solenoid 57 and either allows fluid to be pumped out of the piston reservoir 58 or disengages the pump 60 and allows air pressure within the clutch to be released such that the clutch remains in an idle or "OFF" state. The piston 61 is shifted in a forward direction away from the shaft 32. The clutch housing 30 is also shifted in a forward direction and the friction liner 34 is engaged with the shaft 32. Engagement with the shaft 32 causes the cooling fan 16 to rotate. In the fully engaged state the clutch spring area 38 has an initial internal volume of air. In step 102, the main controller 52 receives or generates a disengagement signal to disengage the clutch assembly 20.

The following steps 104A and 104B are performed simultaneously. In step 104A, the main controller 52 allows fluid to flow and be pumped into the piston reservoir 58 with enough pressure to overcome and compress the spring 35. The solenoid 57 is opened. The piston 61 and the clutch housing 30 are shifted rearward to compress the spring 35 and disengage the friction liner 34 from the shaft 32. The clutch housing 30 is then no longer rotating and is in a disengaged state.

In step 104B, as the spring 35 is compressed the volume of the clutch spring area 38 decreases and the air pressure within the clutch spring area 38 is maintained at an approximately constant pressure. This is unlike the pressure within a traditional dry friction clutch assembly where air pressure within a clutch spring area normally increases due to small clearances between a traditional spring carrier and a piston rod. Air within the clutch spring area 38 is allowed to flow through the anti-air lock carrier 42 via the passages 46, as described above.

In step 106, the controller 52 receives or generates an engagement signal. The following steps 108A and 108B are performed simultaneously. In step 108A, the controller 52 removes, releases, or pumps fluid out of the piston reservoir 58. The piston 61 is shifted in a forward direction by the spring 35, due to lack of pressure within the piston reservoir 58. The clutch housing 30 is engaged with the shaft 32.

In step 108B, pressure within the clutch spring area 38 is again maintained at a relatively constant pressure. Air external to the clutch spring area 38 is drawn into the clutch spring area 38 via the passages 46.

Throughout the above-described method, the solenoid 57 is generally closed when fluid is neither being supplied nor removed from the piston reservoir 58. Also, the above-described steps are meant to be illustrative examples; the steps may be performed sequentially, synchronously, simultaneously, or in a different order depending upon the application.

The present invention provides a fan drive system that accounts for fluid pressure changes within a clutch spring area during the engagement and disengagement of an engine fan. The present invention increases the operating life and robustness of a clutch assembly by accounting for changes in air pressure within the clutch spring area, by minimizing the passage of air through bearing grease seals.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. A clutch assembly for a fan drive system of an engine comprising:
   a translatable clutch housing coupled to a fan;
   a rotating shaft coupling a drive pulley of the engine;
   a liner residing between and engageable with said translatable clutch housing and said rotating shaft;
   a clutch spring engaging said translatable clutch housing with said rotating shaft; and
   a spring carrier retaining at least a portion of said clutch spring and comprising at least one passage for fluid pressure adjustment within a clutch spring area.

2. An assembly as in claim 1 wherein said at least one passage comprises at least one of a groove, a channel, a slot, and a hole.

3. An assembly as in claim 1 wherein said at least one passage extends axially fore and aft across said spring carrier and allows for passage of a fluid therein.

4. An assembly as in claim 1 wherein said at least one passage is formed integrally within a wall of said spring carrier.

5. An assembly as in claim 1 wherein said at least one passage is formed integrally on an internal side of said spring carrier.

6. An assembly as in claim 1 wherein said at least one passage resides between said spring carrier and a pneumatic transfer conduit.

7. An assembly as in claim 1 wherein depth of said at least one passage is larger than a clearance between said spring retainer and a pneumatic transfer conduit.

8. An assembly as in claim 1 wherein said at least one passage is formed integrally on an external side of said spring carrier.

9. An assembly as in claim 1 wherein said at least one passage resides on a rear spring loading flange of said spring carrier.

10. An assembly as in claim 1 further comprising a pneumatic transfer conduit, said spring carrier residing over said pneumatic transfer conduit.

11. An assembly as in claim 10 wherein said at least one passage allows transfer of a fluid between said spring carrier and said pneumatic transfer conduit.

12. An assembly as in claim 1 wherein said at least one passage allows for transfer of a fluid between at least one bearing assembly and a pneumatic transfer conduit.

13. A clutch assembly for a fan drive system of an engine comprising:
   a translatable clutch housing coupled to a fan;
   a rotating shaft coupling a drive pulley of the engine;
   a liner residing between and engageable with said translatable clutch housing and said rotating shaft;
   a clutch spring engaging said translatable clutch housing with said rotating shaft; and
   a spring carrier retaining at least a portion of said clutch spring and comprising at least one axial passage for transfer of fluid through said spring carrier.

14. An assembly as in claim 13 wherein said at least one passage comprises at least one of a groove, a channel, a slot, and a hole.

15. An assembly as in claim 13 wherein said at least one passage extends axially fore and aft across said spring carrier and allows for passage of a fluid therein.

16. An assembly as in claim 13 wherein said at least one passage is formed integrally within a wall of said spring carrier.

17. An assembly as in claim 13 wherein said at least one passage is formed integrally on an internal side of said spring carrier.

18. An assembly as in claim 13 wherein said at least one passage resides between said spring carrier and a pneumatic transfer conduit.

19. An assembly as in claim 13 wherein depth of said at least one passage is larger than a clearance between said spring retainer and a pneumatic transfer conduit.

20. An assembly as in claim 13 further comprising a pneumatic transfer conduit, said spring carrier residing over said pneumatic transfer conduit.

21. An assembly as in claim 20 wherein said at least one passage allows transfer of a fluid between said spring carrier and said pneumatic transfer conduit.

22. An assembly as in claim 13 wherein said at least one passage allows for transfer of a fluid between at least one bearing assembly and a pneumatic transfer conduit.

23. A fluidically controlled fan drive system for an engine comprising:
   a fan;
   a clutch assembly comprising;
   a translatable clutch housing coupled to said fan;
   a rotating shaft coupling a drive pulley of the engine; and
   a liner residing between and engageable with said translatable clutch housing and said rotating shaft;
   a clutch spring engaging said translatable clutch housing with said rotating shaft; and
   a spring retainer retaining at least a portion of said clutch spring and comprising at least one passage for fluid pressure adjustment within a clutch spring area;
   a solenoid fluidically coupled to said clutch assembly; and
   a controller fluidically actuating said translatable clutch housing via said solenoid.

24. A system as in claim 23 wherein said controller pneumatically actuates said translatable clutch housing.

25. A system as in claim 23 wherein said controller hydraulically actuates said translatable clutch housing.

26. A method of operating a clutch assembly for an engine comprising:
   receiving an engagement transition signal;
   altering fluid pressure within a piston reservoir in response to said engagement transition signal;
   translating a clutch housing to alter engagement with a rotating shaft in response to said alteration; and
   adjusting air pressure within a clutch spring area in response to said translation via a spring carrier having at least one passage.

27. A method as in claim 26 wherein adjusting said air pressure comprises forcing air is out of said clutch spring area through said at least one passage when transitioning to a clutch disengaged state.

28. A method as in claim 26 wherein adjusting said air pressure comprises forcing air into said clutch spring area through said at least one passage when transitioning to a clutch engaged state.

29. A clutch assembly for a fan drive system of an engine comprising:
   a translatable clutch housing coupled to a fan;
   a rotating shaft coupling a drive pulley of the engine;

a liner residing between and engageable with said translatable clutch housing and said rotating shaft;
a clutch spring engaging said translatable clutch housing with said rotating shaft; and
a piston rod comprising;
a fluid channel for fluid pressure actuation of said clutch spring; and
at least one passage for fluid pressure adjustment within a clutch spring area.

30. A clutch assembly as in claim 29 wherein said at least one passage comprises an anti-lock groove that extends across a spring carrier and a bearing of the clutch assembly.

* * * * *